US011353872B2

(12) United States Patent
Xiao (10) Patent No.: US 11,353,872 B2
(45) Date of Patent: Jun. 7, 2022

(54) SYSTEMS AND METHODS FOR SELECTIVELY CAPTURING AND FILTERING SENSOR DATA OF AN AUTONOMOUS VEHICLE (71) Applicant: Pony AI Inc., Grand Cayman (KY)

(72) Inventor: Sinan Xiao, Mountain View, CA (US)

(73) Assignee: Pony AI Inc., Grand Cayman (KY)

( * ) Notice: Subject to any disclaimer, the term of this patent is extended or adjusted under 35 U.S.C. 154(b) by 233 days.

(21) Appl. No.: 16/523,934

(22) Filed: Jul. 26, 2019

(65) Prior Publication Data
US 2020/0033859 A1 Jan. 30, 2020

Related U.S. Application Data (60) Provisional application No. 62/712,071, filed on Jul. 30, 2018.

(51) Int. Cl.
G05D 1/00 (2006.01)
G05D 1/02 (2020.01)

(52) U.S. Cl.
CPC ......... G05D 1/0088 (2013.01); G05D 1/0248 (2013.01); G05D 2201/0213 (2013.01)

(58) Field of Classification Search
CPC ............... G05D 1/0088; G05D 1/0248; G05D 2201/0213
See application file for complete search history.

(56) References Cited

U.S. PATENT DOCUMENTS

| 7,102,496 | B1 | 9/2006 | Ernst, Jr. et al. |
| 7,158,866 | B2 | 1/2007 | Gustafsson et al. |
| 8,942,964 | B2* | 1/2015 | McWilliams ............ G09B 9/48 703/6 |
| 9,720,412 | B1* | 8/2017 | Zhu ........................ B60W 30/00 701/23 |
| 10,360,476 | B2 | 7/2019 | Steinhardt et al. |
| 10,661,794 | B2* | 5/2020 | Niino ................. B60T 2201/022 |
| 2004/0193347 | A1* | 9/2004 | Harumoto ................ G08G 1/16 701/45 |
| 2013/0223686 | A1* | 8/2013 | Shimizu ................. G08G 1/166 382/103 |
| 2017/0285165 | A1* | 10/2017 | Khilifi .................... G01S 13/931 342/70 |

(Continued)

Primary Examiner — Russell Frejd
Assistant Examiner — Brittany Renee Peko
(74) Attorney, Agent, or Firm — Sheppard Mullin Richter & Hampton LLP (57) ABSTRACT A method comprises obtaining one or more parameters of an autonomous vehicle, the parameters including any of a position, path, and/or speed of the autonomous vehicle. The method further includes identifying, based on the one or more parameters of the autonomous vehicle, a region of interest from a plurality of regions surrounding the autonomous vehicle. The method further includes controlling, based on the region of interest, one or more sensors mounted on a surface of the autonomous vehicle to capture sensor data of the region of interest and not capture sensor data from the one or more other regions of the plurality of regions surrounding the autonomous vehicle. The method further includes providing the captured sensor data to a processor, the processor being capable of facilitating, based on the captured sensor data of the region of interest, one or more autonomous vehicle driving actions.

21 Claims, 7 Drawing Sheets (56) References Cited

U.S. PATENT DOCUMENTS

2019/0004538 A1\* 1/2019 Wood .................. G05D 1/0297
  701/24
2019/0238799 A1  8/2019 Mahmound et al.
2019/0265714 A1\* 8/2019 Ball ........................ G05D 1/02
  701/70
2021/0110484 A1\* 4/2021 Shalev-Shwartz ..... G06Q 40/08

\* cited by examiner

SYSTEMS AND METHODS FOR SELECTIVELY CAPTURING AND FILTERING SENSOR DATA OF AN AUTONOMOUS VEHICLE

CROSS REFERENCE TO RELATED APPLICATIONS

This application claims the benefit of and priority to U.S. Provisional Patent Application No. 62/712,071 filed on Jul. 30, 2018, which is hereby incorporated by reference in its entirety.

TECHNICAL FIELD

The present disclosure relates generally to autonomous vehicles, and in particular, some embodiments relate to selectively capturing and/or filtering sensor data of an autonomous vehicle.

BACKGROUND

Under conventional approaches, sensor systems of autonomous vehicles collect large amounts of sensor data. Typically, the sensor systems continuously collect sensor data from all around the autonomous vehicle, regardless of the behavior of the vehicle (e.g., a directional path of the autonomous vehicle). Sensor data may include camera images, reflected laser information, and/or the like. This can place a large computational burden on the sensor systems, as well as the other systems of the autonomous vehicle. For example, all of the sensor data must typically be transmitted to a central computing system of the autonomous vehicle, and the central computing system must process all of the sensor data.

SUMMARY

A claimed solution rooted in computer technology overcomes problems specifically arising in the realm of computer technology. In various implementations, a system is configured to selectively capture and/or filter sensor data of an autonomous vehicle prior to the sensor data being transmitted to a central computing system of the autonomous vehicle. For example, the system may control various sensors of the autonomous vehicle to only capture sensor data within one or more regions of interest (e.g., a region in front of the autonomous vehicle when the autonomous vehicle is moving in a straight directional path). In another example, the system may filter the sensor data, prior to transmission of the sensor data (e.g., to the central computing system), to include only the sensor data within the one or more regions of interest. Accordingly, the system may reduce the amount of sensor data that is captured, reduce the amount of sensor data that is transmitted, and/or reduce the amount sensor data that is processed by the central computing system of the autonomous vehicle (and/or other systems of the autonomous vehicle).

Various embodiments of the present disclosure include autonomous vehicle multi-region sensor system comprising one or more sensors mounted on a surface of an autonomous vehicle, the one or more sensors capable of capturing sensor data of a plurality of regions surrounding the autonomous vehicle. A region of interest determination engine is configured to obtain one or more parameters of an autonomous vehicle, the parameters including any of a position of the autonomous vehicle, a path of the autonomous vehicle, and a speed of the autonomous vehicle. The region of interest determination engine is further configured to identify, based on the one or more parameters of the autonomous vehicle, a region of interest from a plurality of regions surrounding an autonomous vehicle; a multi-region sensor control engine configured to control, based on the region of interest, one or more sensors mounted on a surface of the autonomous vehicle to capture sensor data of the region of interest and not capture sensor data from the one or more other regions of the plurality of regions surrounding the autonomous vehicle. A multi-region sensor communication engine is configured to provide the captured sensor data to an autonomous vehicle sensor data processing system, the autonomous vehicle sensor data processing system being logically and physically separate from the autonomous vehicle multi-region sensor system, the autonomous vehicle sensor data processing system being capable of facilitating, based on the captured sensor data, one or more autonomous vehicle driving actions.

In some embodiments, the plurality of regions surrounding the autonomous vehicle include a front region corresponding to a region in front of the autonomous vehicle, a left region corresponding to a region to the left of the autonomous vehicle, a right region corresponding to a region to the right of the autonomous vehicle, and a rear region corresponding to a region to the rear of the autonomous vehicle.

In some embodiments, the one or more sensors comprise a rotatable laser scanning system and one or more cameras.

In some embodiments, the multi-region sensor control engine is configured to turn off a particular portion of the one or more sensors when the autonomous vehicle is moving along a straight path, the particular portion of the one or more sensors comprising the sensors associated with any of the left region, the right region, and the rear of the autonomous vehicle.

In some embodiments, the multi-region sensor control engine is configured to control the rotatable laser scanning system to capture sensor data when it is facing the region of interest, and configured to control the rotatable laser scanning system not to capture sensor data when it is not facing the region of interest.

Various embodiments of the present disclosure include methods comprising obtaining one or more parameters of an autonomous vehicle, the parameters including any of a position of the autonomous vehicle, a path of the autonomous vehicle, and a speed of the autonomous vehicle. The methods further include identifying, based on the one or more parameters of the autonomous vehicle, a region of interest from a plurality of regions surrounding the autonomous vehicle. The methods further includes controlling, based on the region of interest, one or more sensors mounted on a surface of the autonomous vehicle to capture sensor data of the region of interest and not capture sensor data from the one or more other regions of the plurality of regions surrounding the autonomous vehicle. The methods further includes providing the captured sensor data to a processor, the processor being capable of facilitating, based on the captured sensor data of the region of interest, one or more autonomous vehicle driving actions.

In some embodiments, the plurality of regions surrounding the autonomous vehicle include a front region corresponding to a region in front of the autonomous vehicle, a left region corresponding to a region to the left of the autonomous vehicle, a right region corresponding to a region to the right of the autonomous vehicle, and a rear region corresponding to a region to the rear of the autonomous vehicle.

In some embodiments, the one or more sensors comprise a rotatable laser scanning system and one or more cameras.

In some embodiments, the controlling comprises controlling the rotatable laser scanning system to capture sensor data when it is facing the region of interest, and configured to control the rotatable laser scanning system not to capture sensor data when it is not facing the region of interest.

Various embodiments of the present disclosure include systems comprising an autonomous vehicle multi-region sensor system comprising one or more sensors mounted on a surface of an autonomous vehicle, the one or more sensors capable of capturing sensor data of a plurality of regions surrounding the autonomous vehicle. An autonomous vehicle sensor data filtering system is configured to identify, based on one or more parameters of the autonomous vehicle, a region of interest from a plurality of regions surrounding an autonomous vehicle. The autonomous vehicle sensor data filtering system is further configured to filter the sensor data to include only the sensor data of the region of interest, and to provide the filtered sensor data to an autonomous vehicle sensor data processing system configured to facilitate, based on the filtered sensor data, performance of one or more autonomous vehicle driving actions.

In some embodiments, the autonomous vehicle sensor data filtering system is implemented on a programmable board disposed between the autonomous vehicle multi-region sensor system and the autonomous vehicle sensor data processing system.

In some embodiments, the plurality of regions surrounding the autonomous vehicle include a front region corresponding to a region in front of the autonomous vehicle, a left region corresponding to a region to the left of the autonomous vehicle, a right region corresponding to a region to the right of the autonomous vehicle, and a rear region corresponding to a region to the rear of the autonomous vehicle.

In some embodiments, the one or more sensors comprise a rotatable laser scanning system and one or more cameras.

In some embodiments, the autonomous vehicle multi-region sensor system is configured to turn off a particular portion of the one or more sensors when the autonomous vehicle is moving along a straight path, the particular portion of the one or more sensors comprising the sensors associated with any of the left region, the right region, and the rear of the autonomous vehicle.

In some embodiments, the autonomous vehicle multi-region sensor system is configured to control the rotatable laser scanning system to capture sensor data when it is facing the region of interest, and configured to control the rotatable laser scanning system to not capture sensor data when it is not facing the region of interest.

In some embodiments, the captured sensor data includes first image data corresponding to the region of interest, and second image data corresponding to one or more other regions of the plurality of regions surrounding the autonomous vehicle, and the autonomous vehicle sensor data filtering system is configured to remove the second image data from the sensor data.

Various embodiments of the present disclosure include methods comprising capturing, using one or more sensors mounted on a surface of an autonomous vehicle, sensor data of a plurality of regions surrounding an autonomous vehicle; obtaining one or more parameters of an autonomous vehicle, the parameters including any of a position of the autonomous vehicle, a path of the autonomous vehicle, and a speed of the autonomous vehicle; identifying, based on the one or more parameters of the autonomous vehicle, a region of interest from a plurality of regions surrounding an autonomous vehicle; filtering, in response to the identifying the region of interest, the captured sensor data to include only the sensor data of the region of interest; and providing, in response to the filtering, the filtered data to a processor, the processor being capable of facilitating one or more autonomous vehicle driving actions based on the filtered data.

In some embodiments, the one or more sensors comprise a rotatable laser scanning system and one or more cameras.

In some embodiments, the method further comprises further comprising controlling the rotatable laser scanning system to capture sensor data when it is facing the region of interest, and controlling the rotatable laser scanning system to not capture sensor data when it is not facing the region of interest.

In some embodiments, the captured sensor data includes first image data corresponding to the region of interest, and second image data corresponding to one or more other regions of the plurality of regions surrounding the autonomous vehicle, and the filtering comprises removing the second image data from the sensor data.

These and other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

DETAILED DESCRIPTION

A claimed solution rooted in computer technology overcomes problems specifically arising in the realm of computer technology. In various implementations, a system is configured to selectively capture and/or filter sensor data of an autonomous vehicle prior to the sensor data being transmitted to a central computing system of the autonomous vehicle. For example, the system may control various sensors of the autonomous vehicle to only capture sensor data within one or more regions of interest (e.g., a region in front of the autonomous vehicle when the autonomous vehicle is moving in a straight directional path). In another example, the system may filter the sensor data, prior to transmission of the sensor data (e.g., to the central computing system), to include only the sensor data within the one or more regions of interest. Accordingly, the system may reduce the amount of sensor data that is captured, reduce the amount of sensor data that is transmitted, and/or reduce the amount sensor data that is processed by the central computing system of the autonomous vehicle (and/or other systems of the autonomous vehicle).

Figure 1:
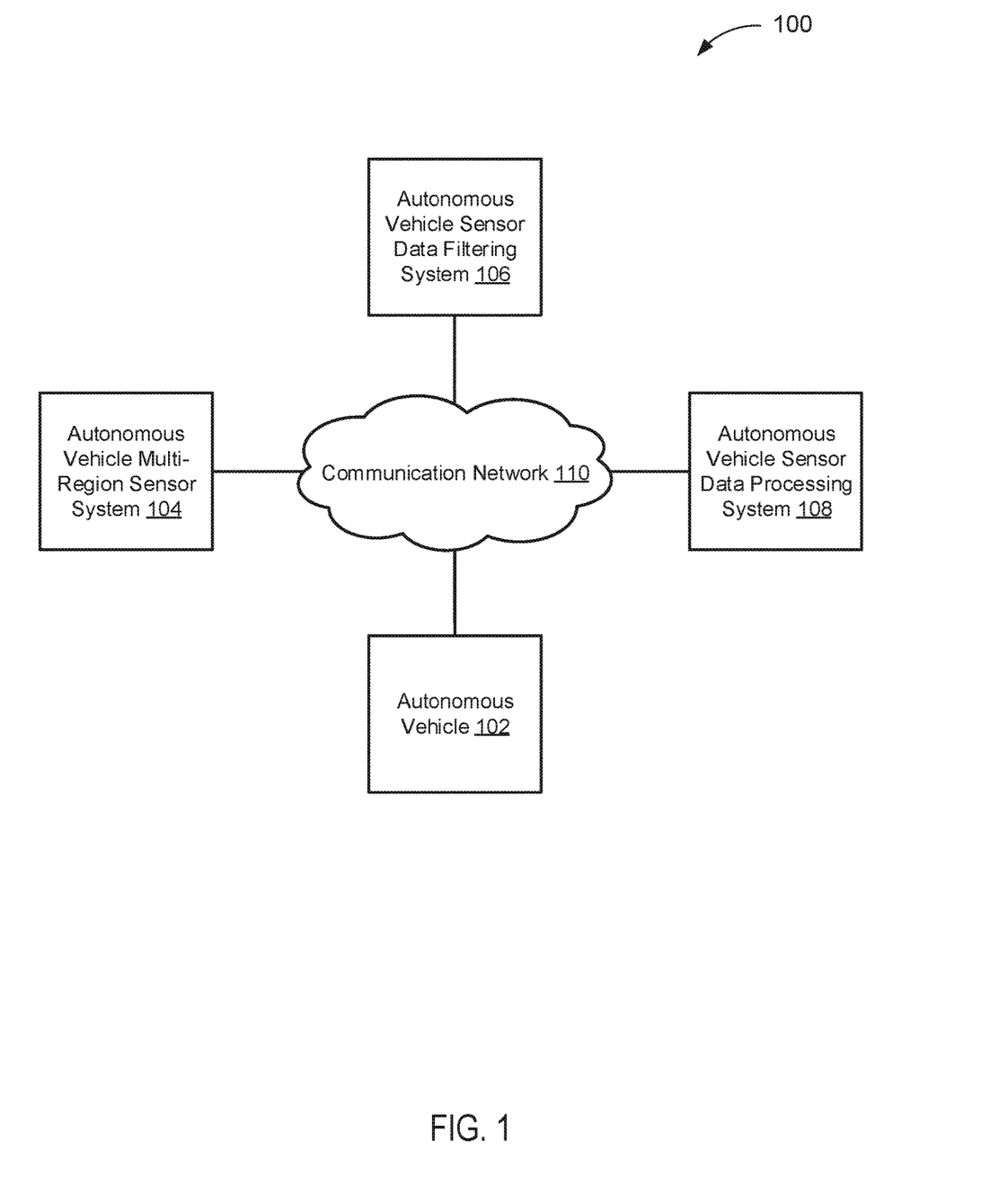
FIG. 1 depicts a diagram of an example system for selectively capturing and/or filtering autonomous vehicle sensor data of one or more regions of interest according to some embodiments.

FIG. 1 depicts a diagram 100 of an example system for selectively capturing and/or filtering autonomous vehicle sensor data of one or more regions of interest according to some embodiments. In the example of FIG. 1, the system includes an autonomous vehicle 102, an autonomous vehicle multi-region sensor system 104, an autonomous vehicle sensor data filtering system 106, an autonomous vehicle sensor data processing system 108, and a communication network 110. In various embodiments, the systems 104-108 and the communication network 110 are implemented as part of the autonomous vehicle 102. The autonomous vehicle 102 may be capable of sensing its environment and/or navigating with a limited human input or without human input. The "vehicle" discussed in this paper typically includes a vehicle that travels on the ground (e.g., car, truck, bus), but may also include a vehicle that travels in the air (e.g., drones, helicopter, airplanes, and so on), travels on water (e.g., a boat), and/or the like. The "vehicle" discussed in this paper may or may or accommodate one or more passengers therein.

The autonomous vehicle multi-region sensor system 104 may function to selectively capture sensor data of one or more regions of interest. The autonomous vehicle multi-region sensor system 104 may be mounted on one or more portions (e.g., exterior surfaces, interior surfaces) of an autonomous vehicle, and may include one or more sensors. As used herein, sensors may include laser scanning systems (e.g., Lidar systems), radar systems, cameras, and/or the like. The autonomous vehicle multi-region sensor system 104 may determine the region of interest based on one or more parameters of an autonomous vehicle. The parameters may include, for example, a directional path of an autonomous vehicle, a position of an autonomous vehicle, a speed of an autonomous vehicle, and/or the like.

In some embodiments, the autonomous vehicle multi-region sensor system 104 may control some or all of the sensors to only capture sensor data for a region of interest, and not to capture sensor data for other regions. For example, an autonomous vehicle may be associated with different regions (e.g., regions surrounding the autonomous vehicle). The regions may include a front region corresponding to a region in front of the autonomous vehicle, a left region corresponding to a region to the left of the autonomous vehicle, a right region corresponding to a region to the right of the autonomous vehicle, and a rear region corresponding to a region to the rear of the autonomous vehicle, and/or the like. The regions may be defined according to an x, y, and/or z axis. Region size and/or position relative to the autonomous vehicle may vary, as discussed elsewhere herein.

The autonomous vehicle multi-region sensor system 104 may control laser scanner sensors, which may be rotatable, to only capture sensor data when the sensors are facing the region of interest (e.g., a front region when the vehicle is moving straight), and not capture sensor data when the sensors are facing rear region and/or side region(s). Similarly, in some embodiments, the autonomous vehicle multi-region sensor system 104 may control cameras facing a region of interest to capture sensor data (e.g., image data), while the cameras not facing a region of interest are controlled to not capture sensor data.

The autonomous vehicle sensor data filtering system 106 may function to receive sensor data, selectively filter sensor data for a region of interest, and/or transmit filtered sensor data. In some embodiments, the autonomous vehicle sensor data filtering system 106 receives the sensor data from the autonomous vehicle multi-region sensor system 104, filters the sensor data, and transmits the filtered sensor data to the autonomous vehicle sensor data processing system 108. This may, for example, reduce the amount of sensor data that the autonomous vehicle sensor data processing system 108 receives and/or processes. In some embodiments, the autonomous vehicle sensor data filtering system 106 is implemented as one or more programmable boards (e.g., programmable circuit boards) that are disposed logically and/or physically between the autonomous vehicle multi-region sensor system 104 and the autonomous vehicle sensor data processing system 108. For example, there may be one or more programmable boards for each type of sensor (e.g., a programmable board to filter camera sensor data, a programmable board to filter laser scanning system sensor data, and/or the like), or there may be a single programmable board for all sensors.

The autonomous vehicle sensor data processing system 108 may function to process sensor data to sense an environment surrounding an autonomous vehicle and/or cause an autonomous vehicle to perform one or more autonomous vehicle driving actions (or, simply, "driving actions"). For example, the autonomous vehicle sensor data processing system 108 may analyze sensor data to identify objects (e.g., traffic signals, road signs, other vehicles, pedestrians, and obstacles) in one or more regions surrounding the autonomous vehicle. As used herein, driving actions may include controlling braking, acceleration, and/or steering without real time human input. Furthermore, as used herein, "real time human input" is intended to represent a human input that is needed to concurrently control wheel movement of a non-self-driving vehicle, such as gear shifting, steering control, braking pedal control, accel pedal control, crutch pedal control, and so on. The autonomous vehicle sensor data processing system 108 may be implemented as a central computing system of an autonomous vehicle.

In various embodiments, the autonomous vehicle sensor data processing system 108 may not include filtering functionality. This may allow, for example, the autonomous vehicle sensor data processing system 108 to be implemented using less powerful components (e.g., slower processors, less memory, and/or the like), and still achieve all of the functionality of an autonomous vehicle.

The communications network 110 may represent one or more computer networks (e.g., LAN, WAN, bus, or the like) or other transmission mediums. The communication network 110 may provide communication between the autonomous vehicle 102, systems 104-108 and/or other systems/engines described herein. In some embodiments, the communication network 110 includes one or more computing devices, routers, cables, buses, and/or other network topologies (e.g., mesh, and the like). In some embodiments, the communication network 110 may be wired and/or wireless. In various embodiments, the communication network 110 may include the Internet, one or more wide area networks (WANs) or local area networks (LANs), one or more networks that may be public, private, IP-based, non-IP based, and so forth.

Figure 2:
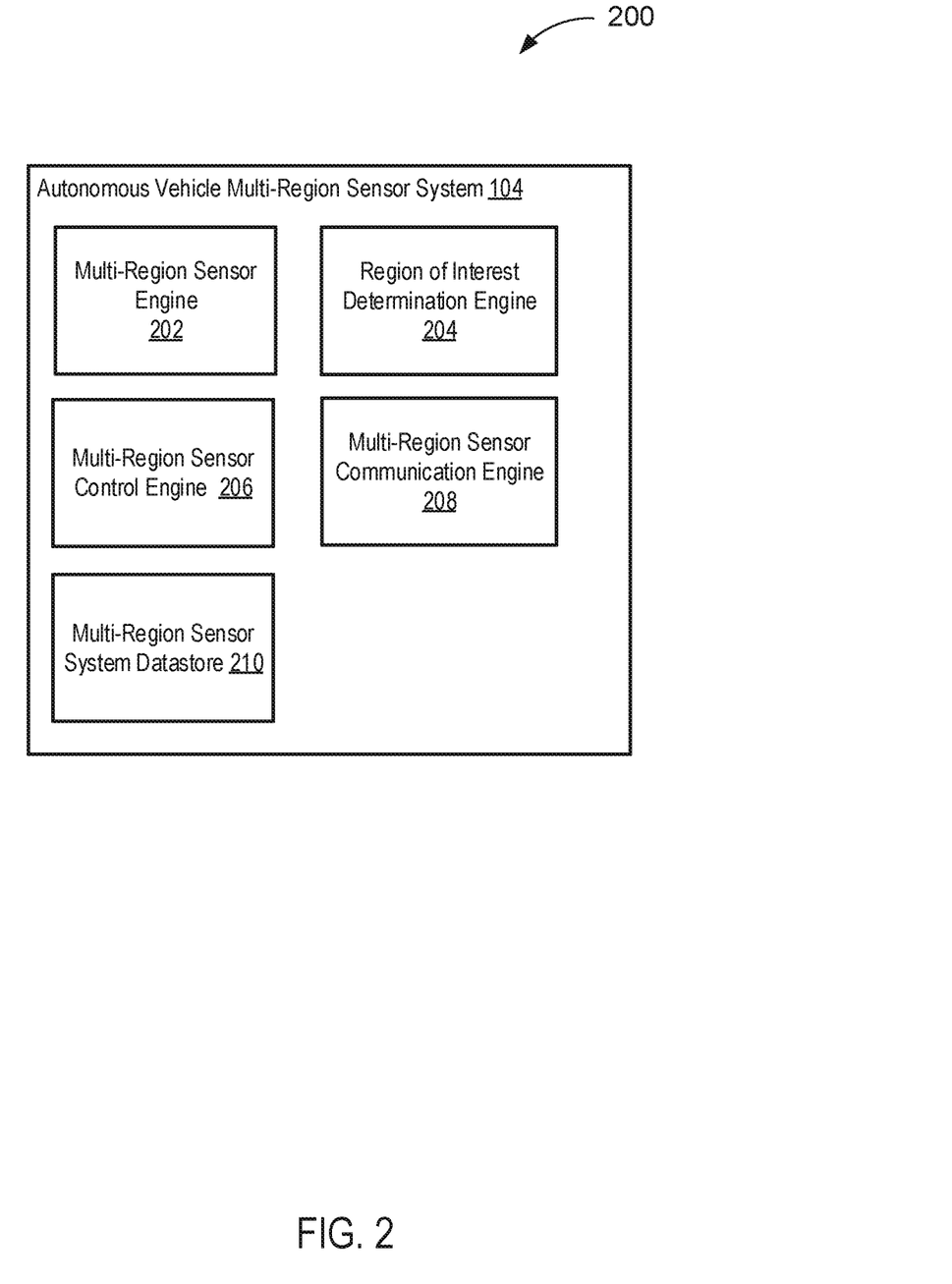
FIG. 2 depicts a diagram of an example of an autonomous vehicle multi-region sensor system according to some embodiments.

FIG. 2 depicts a diagram 200 of an example of an autonomous vehicle multi-region sensor system 104 according to some embodiments. In the example of FIG. 2, the autonomous vehicle multi-region sensor system 104 includes a multi-region sensor engine 202, a region of interest determination engine 204, a multi-region sensor control engine 206, a multi-region sensor communication engine 208, and a multi-region sensor system datastore 210.

The multi-region sensor engine 202 may function to capture sensor data in one or more regions surrounding an autonomous vehicle. The multi-region sensor engine 202 may include one or more sensors. The sensors may include one or more laser scanning systems, radar systems, cameras, and/or the like.

In some embodiments, the sensors may include a rotatable laser scanning system. The rotatable laser scanning system may include a laser, scanner and optics, photodetector and receiver electronics, and position and navigation systems. The rotatable laser scanning system may project light (e.g., pulsed laser light) on regions surrounding an autonomous vehicle (e.g., an autonomous vehicle the rotatable laser scanning system is mounted on), and measure the reflected pulses. The reflected pulses may be used to generate representations (e.g., 3D representations) of the regions surrounding the autonomous vehicle. The rotatable laser scanning system may rotate 360 degrees in order to capture sensor data for the regions surrounding the autonomous vehicle.

In some embodiments, cameras may be mounted on the autonomous vehicle to capture images (or, image data) of regions surrounding the autonomous vehicle. For example, the cameras may capture images in front of the autonomous vehicle, on the sides of the autonomous vehicle, above the autonomous vehicle, below the autonomous vehicle, and/or behind the autonomous vehicle.

The region of interest determination engine 204 may function to determine one or more regions of interest. The one or more regions of interest may be determined based on one or more parameters and/or one or more region of interest rules. The parameters may include a position of the autonomous vehicle, a path of the autonomous vehicle, and a speed of the autonomous vehicle. The position may be an absolute position (e.g., navigational coordinate position) and/or relative position (e.g., a position relative to one or more objects, such as other vehicles, road conditions). The path may be a current path (e.g., currently driving straight) and/or a predicted path (e.g., road is curving right in 50 meters, so path is predicted to turn right in 50 meters).

The region of interest rules may be predetermined and/or customizable. For example, the region of interest rules may include some or all of the following:

Front region is a region of interest when the autonomous vehicle is moving straight Front region and a side region (e.g., right side region) are regions of interest when the autonomous vehicle is turning towards that side (e.g., right)

The size of a region of interest (e.g., as determined by x,y, and/or z axis) may be based on one or more parameters of the autonomous vehicle. For example, when moving below a threshold speed (e.g., 25 mph), the size of a region of interest is reduced. Similarly, the size of a region of interest may scale based on one or more parameters of the autonomous vehicle.

The location/position of a region of interest may be based on the one or more parameters of the autonomous vehicle. For example, at lower speeds, a region of interest may be directly adjacent to the autonomous vehicle, while at increased speeds, a region of interest may begin at a distance away from the vehicle (e.g., 5 m in front of the autonomous vehicle).

The multi-region sensor control engine 206 may function to control the multi-region sensor engine 202. More specifically, the multi-region sensor control engine 206 may function to control the one or more sensors of the multi-region sensor engine 202, and/or components thereof. In some embodiments, the multi-region sensor control engine 206 may control a rotatable laser scanner system to only capture sensor data when it is facing a region of interest, and control the rotatable laser scanner system to not capture sensor data when it is not facing a region of interest. For example, as the laser scanner system rotates, the laser scanner system may be controlled to project light only when it is facing a region of interest. Similarly, the multi-region sensor control engine 206 may control other components of the laser tracking system (e.g., scanner and optics, etc.) in order to capture sensor data only when facing a region of interest. For example, the rotatable laser scanning system continue to project light when it is not facing a region of interest, but the optics may be controlled (e.g., rotated/moved) such that the light is not projected and/or received in order to capture sensor data.

Similarly, the multi-region sensor control engine 206 may function to control one or more cameras facing a region of interest to capture sensor data of the region of interest, and control the cameras not facing a region of interest to not capture sensor data. For example, the cameras may be powered off, controlled to not capture images, controlled to delete and/or not store captured images, and/or the like.

In some embodiments, the multi-region sensor control engine 206 may function to control one or more sensors based on one more sensor control rules. For example, the sensor control rules may include some or all of the following:

Turn off sensor(s) on the sides when the autonomous vehicle is moving straight

When the autonomous vehicle turns, turn off (or enter a standby mode) the sensor(s) on the opposite side When the autonomous vehicle is moving slowly, turn off sensors aiming far ahead (e.g., a predetermined value) of the autonomous vehicle and/or zooming far ahead in the distance (e.g., a predetermined value)

When the autonomous vehicle is moving at an increased speed (e.g., a cruising speed), only keep sensors aiming at a far distance (e.g., a predetermined value)

Front-facing sensors always on (e.g., always capturing sensor data)

The multi-region sensor communication engine 208 may function to send requests, transmit and, receive communications, and/or otherwise provide communication with one or a plurality of systems. In some embodiments, the multi-region sensor communication engine 208 functions to encrypt and decrypt communications. The multi-region sensor communication engine 208 may function to send requests to and receive data from one or more systems through a network or a portion of a network. Depending upon implementation-specified considerations, the multi-region sensor communication engine 208 may send requests and receive data through a connection, all or a portion of which may be a wireless connection. The multi-region sensor communication engine 208 may request and receive messages, and/or other communications from associated systems. Communications may be stored at least temporarily (e.g., cached and/or persistently) in the datastore 210.

Figure 3:
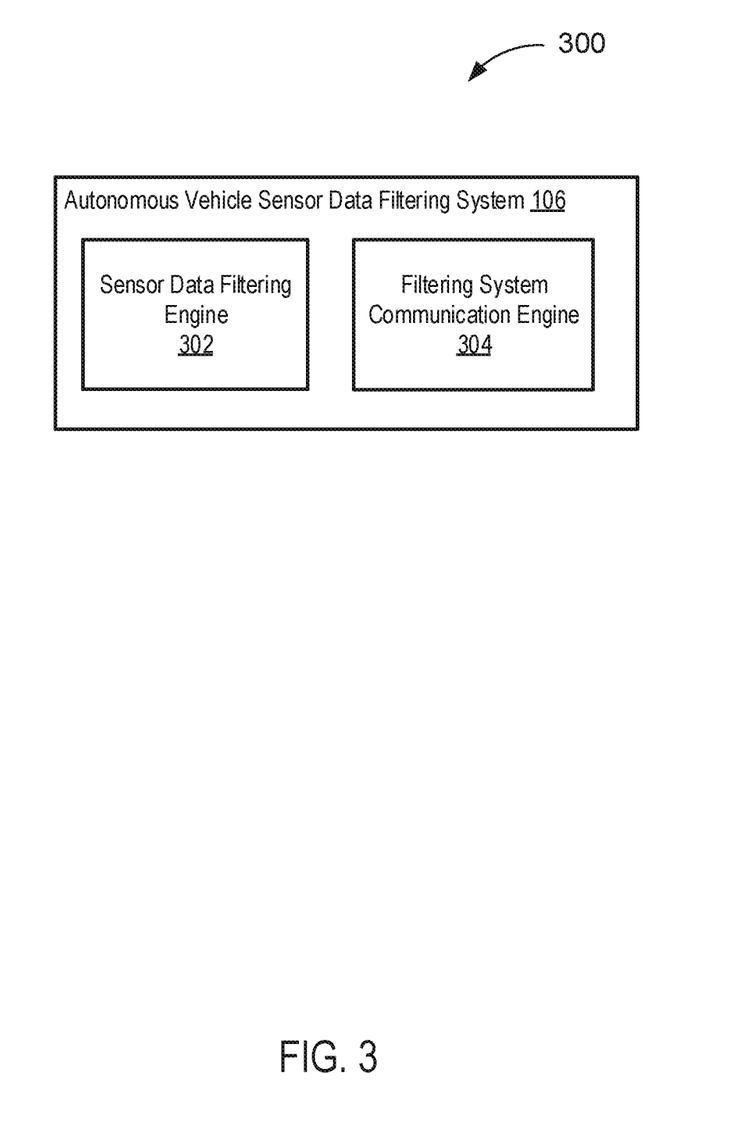
FIG. 3 depicts a diagram of an example of an autonomous vehicle sensor data filtering system according to some embodiments.

FIG. 3 depicts a diagram 300 of an example of an autonomous vehicle sensor data filtering system 106 according to some embodiments. In the example of FIG. 3, the autonomous vehicle sensor data filtering system 106 includes a sensor data filtering engine 302 and a filtering system communication engine 304.

The sensor data filtering engine 302 may function to filter sensor data based on one or more regions of interest. For example, the sensor data filtering engine 302 may remove some or all sensor data corresponding to regions other than a region of interest. In some embodiments, the sensor data filtering engine 302 may crop image data corresponding to regions other than a region of interest, remove laser tracking system sensor data corresponding to a rear region behind the autonomous vehicle when the autonomous vehicle is moving in a straight path, and so forth.

The filtering system communication engine 304 may function to send requests, transmit and, receive communications, and/or otherwise provide communication with one or a plurality of systems. In some embodiments, the filtering system communication engine 304 functions to encrypt and decrypt communications. The filtering system communication engine 304 may function to send requests to and receive data from one or more systems through a network or a portion of a network. Depending upon implementation-specified considerations, the filtering system communication engine 304 may send requests and receive data through a connection, all or a portion of which may be a wireless connection. The filtering system communication engine 304 may request and receive messages, and/or other communications from associated systems. Communications may intercepted from one or more other systems.

In some embodiments, the filtering system communication engine 304 may intercept sensor data transmitted from an autonomous vehicle multi-region sensor system. For example, a multi-region sensor system may intend to transmit sensor data to an intended destination (e.g., an autonomous vehicle sensor data processing system), and the filtering system communication engine 304 may intercept the sensor data before it reaches the intended destination.

Figure 4:
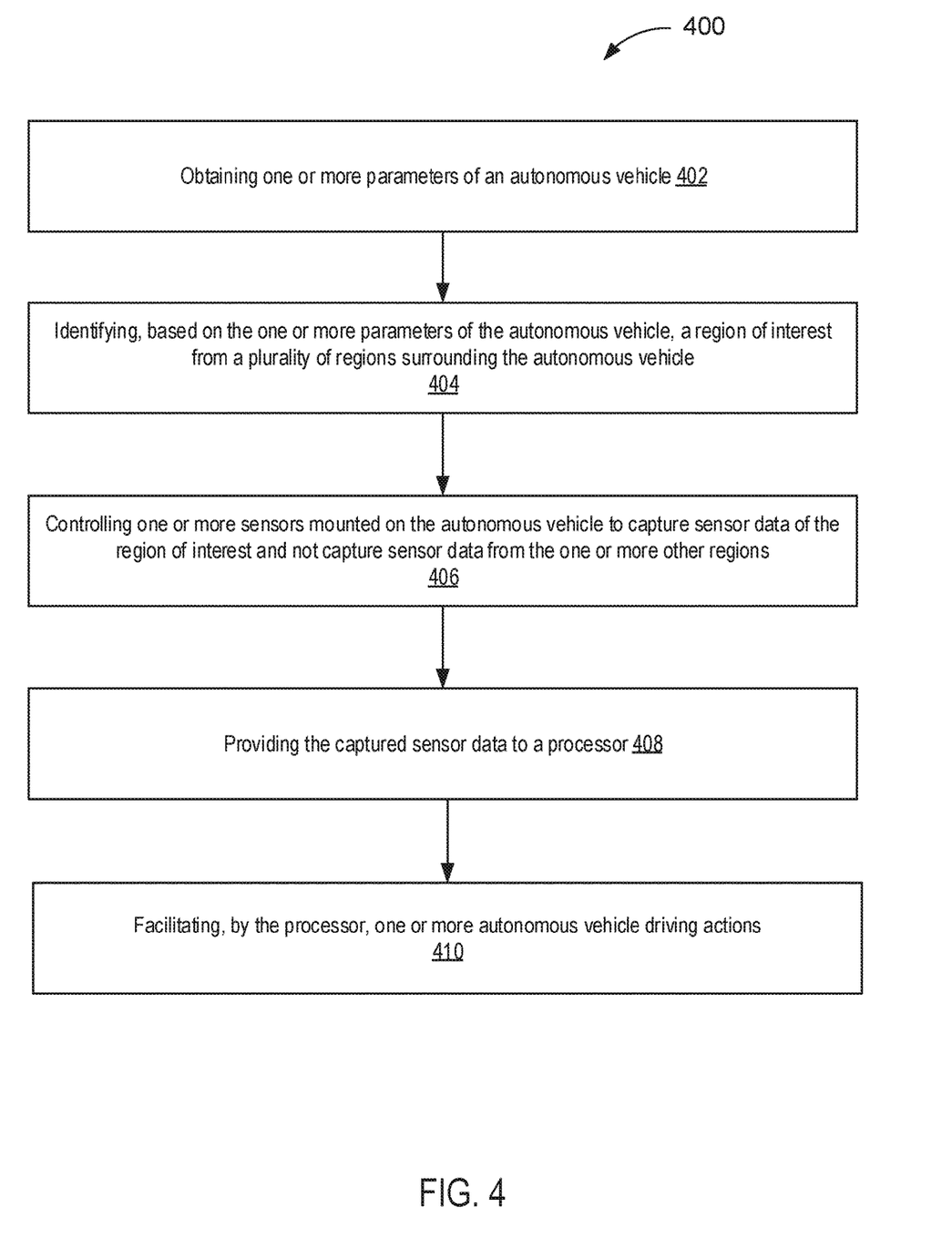
FIG. 4 depicts a flowchart of an example of a method of selectively capturing autonomous vehicle sensor data of one or more regions of interest according to some embodiments.

FIG. 4 depicts a flowchart 400 of an example of a method of selectively capturing autonomous vehicle sensor data of a region of interest according to some embodiments. In this and other flowcharts, the flowchart 400 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 402, an autonomous vehicle multi-region sensor system (e.g., autonomous vehicle multi-region sensor system 104) obtains one or more parameters of an autonomous vehicle (e.g., autonomous vehicle 102). The parameters may include a position of the autonomous vehicle, a path of the autonomous vehicle, and/or a speed of the autonomous vehicle. In some embodiments, a region of interest determination engine (e.g., region of interest determination 204) obtains the parameters.

In step 404, the autonomous vehicle multi-region sensor system identifies a region of interest from a plurality of regions surrounding the autonomous vehicle. The identification may be based on the one or parameters of the autonomous vehicle. In some embodiments, the region of interest determination engine identifies the region of interest.

In step 406, the autonomous vehicle multi-region sensor system controls, based on the region of interest, one or more sensors mounted on a surface of the autonomous vehicle to capture sensor data of the region of interest and not capture sensor data from the one or more other regions of the plurality of regions surrounding the autonomous vehicle. In some embodiments, an multi-region sensor control engine (e.g., multi-region sensor control engine 206) controls the one or more sensors.

In some embodiments, the autonomous vehicle multi-region sensor system controls the one or sensors to turn off a particular portion of the one or more sensors when the autonomous vehicle is moving along a straight path. The particular portion of the one or more sensors may comprise the sensors associated with any of the left region, the right region, and the rear of the autonomous vehicle.

In some embodiments, the autonomous vehicle multi-region sensor system controls a rotatable laser scanning system of the one or more sensors to capture sensor data when it is facing the region of interest, and configured to control the rotatable laser scanning system not to capture sensor data when it is not facing the region of interest.

In step 408, the autonomous vehicle multi-region sensor system provides the captured sensor data to a processor (e.g., autonomous vehicle sensor data processing system 108) capable of facilitating, based on the captured sensor data of the region of interest, one or more autonomous vehicle driving actions. In some embodiments, a multi-region sensor communication engine (e.g., multi-region sensor communication engine 208) provides the captured sensor data.

In step 410, the processor facilitates one or more autonomous vehicle driving actions. For example, the processor may cause the autonomous vehicle to accelerate, brake, steer, and/or the like.

Figure 5:
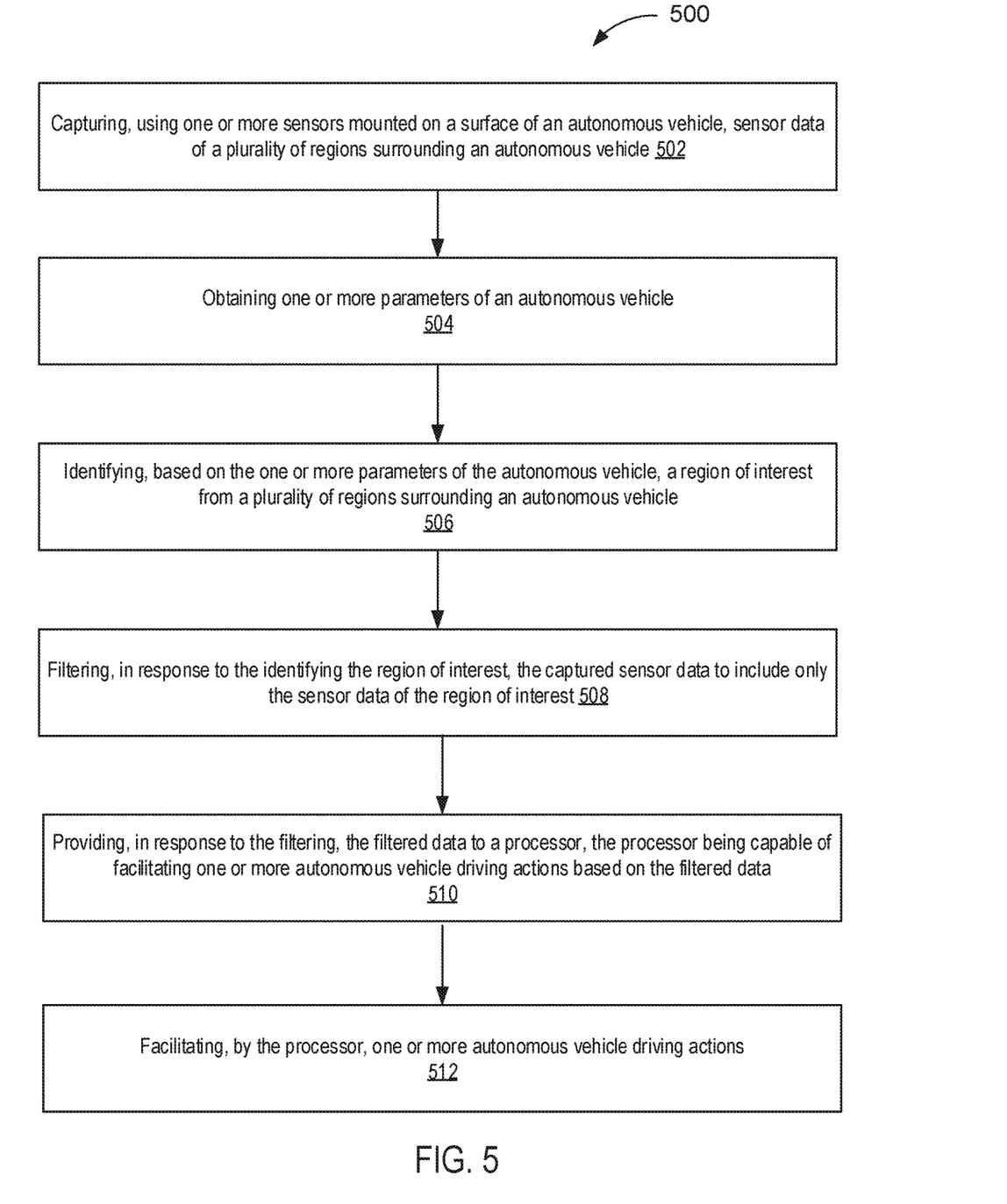
FIG. 5 depicts a flowchart of an example of a method of selectively filtering autonomous vehicle sensor data of one or more regions of interest according to some embodiments.

FIG. 5 depicts a flowchart 500 of an example of a method of selectively filtering autonomous vehicle sensor data of a region of interest according to some embodiments.

In step 502, an autonomous vehicle multi-region sensor system (e.g., autonomous vehicle multi-region sensor system 104) captures, using one or more sensors mounted on a surface of an autonomous vehicle, sensor data of a plurality of regions surround an autonomous vehicle. In some embodiments, a multi-region sensor engine (e.g., multi-region sensor engine 202) captures the sensor data.

In step 504, the autonomous vehicle multi-region sensor system obtains one or more parameters of an autonomous vehicle (e.g., autonomous vehicle 102). The parameters may include a position of the autonomous vehicle, a path of the autonomous vehicle, and/or a speed of the autonomous vehicle. In some embodiments, a region of interest determination engine (e.g., region of interest determination 204) obtains the parameters.

In step 506, the autonomous vehicle multi-region sensor system identifies a region of interest from a plurality of regions surrounding the autonomous vehicle. The identification may be based on the one or parameters of the autonomous vehicle. In some embodiments, the region of interest determination engine identifies the region of interest.

In step 508, an autonomous vehicle sensor data filtering system (e.g., autonomous vehicle sensor data filtering system 106) filters the captured sensor data to include only the sensor data of the region of interest. The filtering may be performed in response to identification of the region of the interest. In some embodiments, the sensor data is received by a filtering system communication engine (e.g., filtering system communication engine 304) from a multi-region sensor communication engine (e.g., multi-region sensor communication engine 208) of the autonomous vehicle multi-region sensor system.

In some embodiments, the filtering may include removing (e.g., cropping) image data outside the region of interest, and/or removing other sensor data (e.g., laser scanning system sensor data) outside the region of interest.

In step 510, the autonomous vehicle sensor data filtering system provides the filtered sensor data to a processor (e.g., autonomous vehicle sensor data processing system 108). The sensor data may be provided in response to the filtering. In some embodiments, the filtering system communication engine provides the filtered sensor data.

In step 512, the processor facilitates one or more autonomous vehicle driving actions. For example, the processor may cause the autonomous vehicle to accelerate, brake, steer, and/or the like. The processor may not need to perform any filtering, and indeed, may not include functionality of filtering, because the sensor data received by the processor has already been filtered.

Figure 6A:
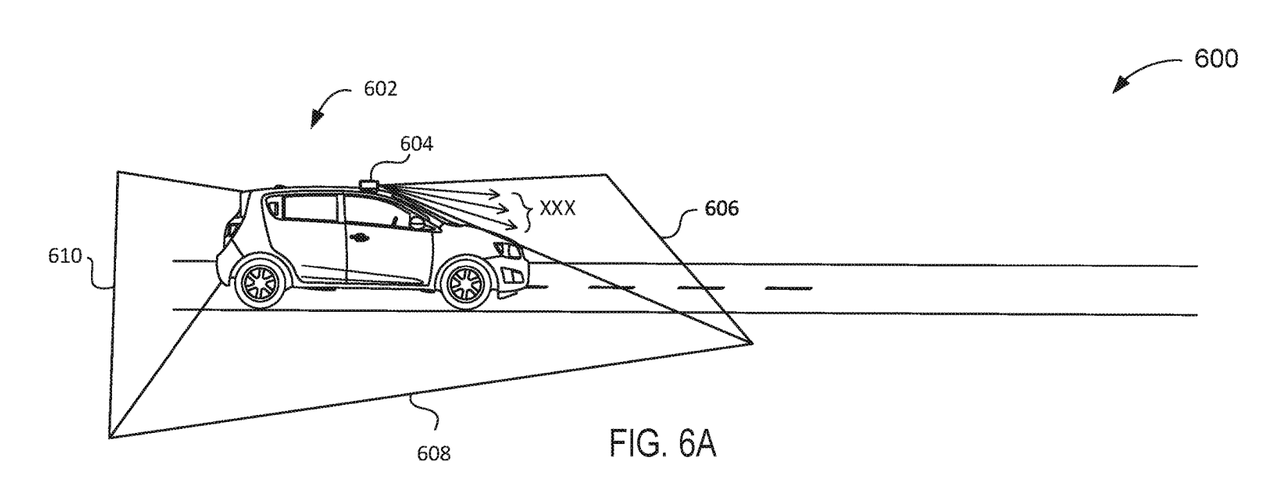
FIGS. 6A-B depict diagrams of an example of an autonomous vehicle according to some embodiments.
Figure 6B:
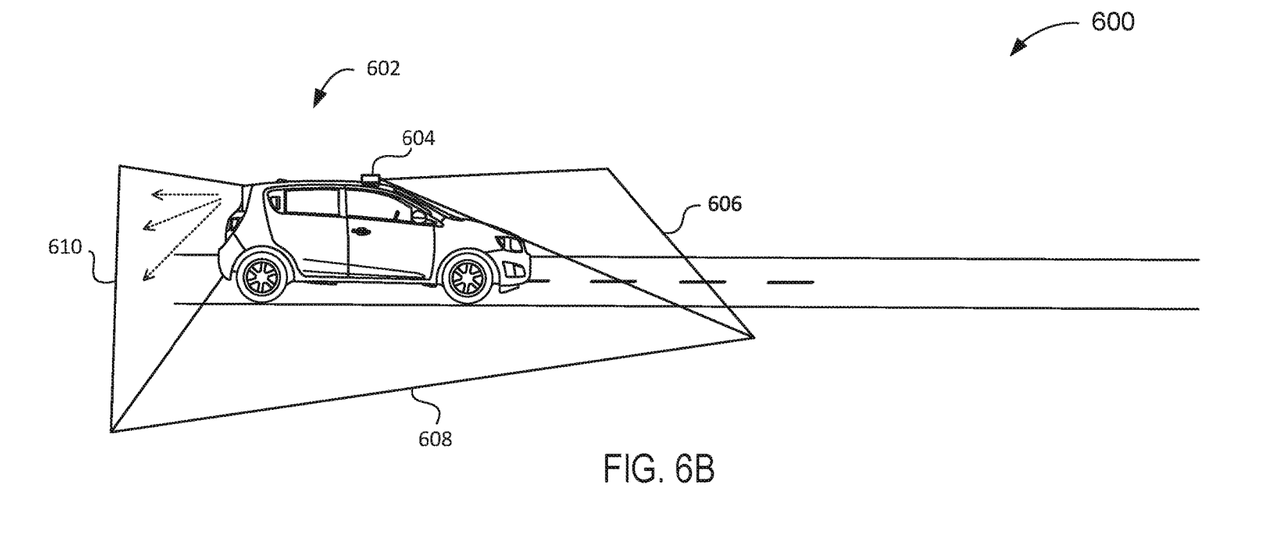

FIGS. 6A-B depict diagrams 600 of an example of an autonomous vehicle 602 according to some embodiments. The autonomous vehicle 602 includes one or more sensors 604. The autonomous vehicle 602 is associated with a plurality of regions 606-610. Region 606 is a front region, region 608 is a side region (the opposite side region is not shown, but it will be appreciated that such a region may be associated with the autonomous vehicle 602). As shown in FIG. 6A, the front region 606 is a region of interest, and the one or more sensors 604 are capturing sensor data of that region of interest 606. Regions 608 and 610 are not regions of interest (e.g., because the autonomous vehicle is moving in a straight path). Accordingly, as shown in FIG. 6B, when the one or more sensors 604 are facing the rear region 610 (as depicted by the dashed lines), the one or more sensors 604 are not capturing sensor data of the rear region 610.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
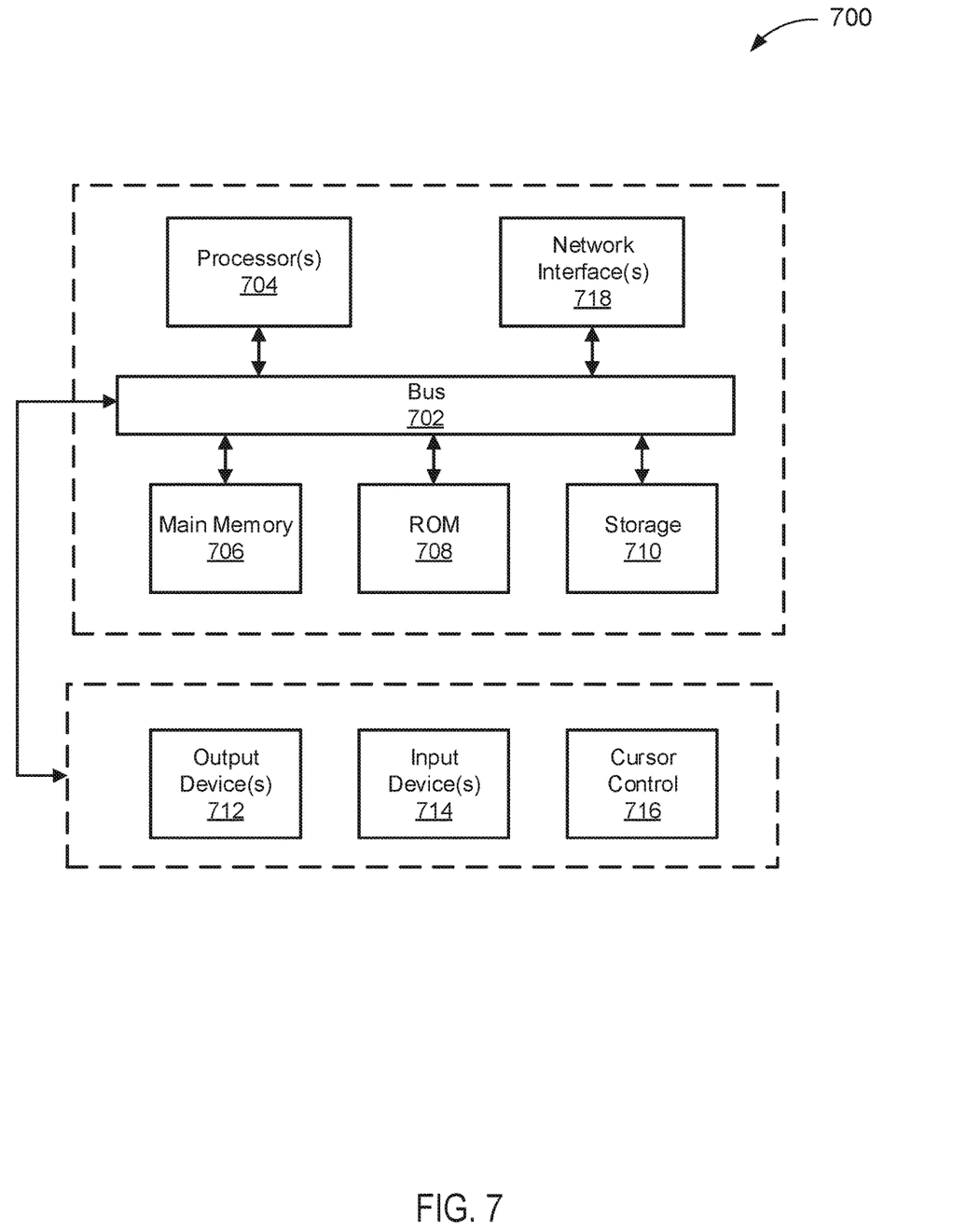
FIG. 7 is a diagram of an example computer system for implementing the features disclosed herein.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to output device(s) 712, such as a cathode ray tube (CRT) or LCD display (or touch screen), for displaying information to a computer user. Input device(s) 714, including alphanumeric and other keys, are coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts.

Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. An autonomous vehicle multi-region sensor system comprising:
   one or more sensors mounted on a surface of an autonomous vehicle, the one or more sensors capturing sensor data of regions surrounding the autonomous vehicle;
   one or more processors; and
   memory storing instructions that, when executed by the one or more processors, cause the one or more processors to:
   obtain one or more parameters of an autonomous vehicle, the parameters including any of a position of the autonomous vehicle, a path of the autonomous vehicle, and a speed of the autonomous vehicle;
   identify, based on the one or more parameters of the autonomous vehicle, a region of interest from a plurality of regions surrounding the autonomous vehicle based on a predicted path and a speed of the autonomous vehicle, wherein a size of the region of interest is based on the speed such that the size of the region of interest correlates with the speed, the identification of the region of interest further comprising:
      in response to the speed being below a threshold speed, and constant or decreasing, determining the region of interest to be directly adjacent to the autonomous vehicle; and
      in response to the speed satisfying the threshold speed, or increasing, determining the region of interest to be at a distance away from the autonomous vehicle;
   control, based on the region of interest, one or more sensors mounted on a surface of the autonomous vehicle to selectively capture sensor data of the region of interest; and
   facilitate, based on the captured sensor data, one or more autonomous vehicle driving actions.

2. The system of claim 1, wherein the plurality of regions surrounding the autonomous vehicle include a front region corresponding to a region in front of the autonomous vehicle, a left region corresponding to a region to the left of the autonomous vehicle, a right region corresponding to a region to the right of the autonomous vehicle, and a rear region corresponding to a region to the rear of the autonomous vehicle.

3. The system of claim 2, wherein the one or more sensors comprise a plurality of sensors, the plurality of sensors comprising a rotatable laser scanning system and one or more cameras.

4. The system of claim 3, wherein the instructions further cause the one or more processors to selectively refrain from projecting light onto and capturing sensor data from a particular portion of the one or more sensors when the autonomous vehicle is moving along a straight path, the particular portion of the one or more sensors comprising the sensors associated with any of the left region, the right region, and the rear of the autonomous vehicle.

5. The system of claim 4, wherein the instructions further cause the one or more processors to capture sensor data when the autonomous vehicle is facing the region of interest, and configured to control the rotatable laser scanning system to refrain from projecting light onto and capturing sensor data when the autonomous vehicle is not facing the region of interest.

6. A method comprising:
   obtaining one or more parameters of an autonomous vehicle, the parameters including any of a position of the autonomous vehicle, a path of the autonomous vehicle, and a speed of the autonomous vehicle;
   identifying, based on the one or more parameters of the autonomous vehicle, a region of interest from a plurality of regions surrounding the autonomous vehicle based on a predicted path and a speed of the autonomous vehicle, wherein a size of the region of interest is based on the speed such that the size of the region of interest correlates with the speed, the identification of the region of interest further comprising:
      in response to the speed being below a threshold speed, and constant or decreasing, determining the region of interest to be directly adjacent to the autonomous vehicle; and
      in response to the speed satisfying the threshold speed, or increasing, determining the region of interest to be at a distance away from the autonomous vehicle;
   controlling, based on the region of interest, one or more sensors mounted on a surface of the autonomous vehicle to selectively capture sensor data of the region of interest; and
   facilitating, based on the captured sensor data of the region of interest, one or more autonomous vehicle driving actions.

7. The method of claim 6, wherein the plurality of regions surrounding the autonomous vehicle include a front region corresponding to a region in front of the autonomous vehicle, a left region corresponding to a region to the left of the autonomous vehicle, a right region corresponding to a region to the right of the autonomous vehicle, and a rear region corresponding to a region to the rear of the autonomous vehicle.

8. The method of claim 7, wherein the one or more sensors comprise a plurality of sensors, the plurality of sensors comprising a rotatable laser scanning system and one or more cameras.

9. The method of claim 7, wherein the controlling comprises selectively refraining from projecting light onto and capturing sensor data from a particular portion of the one or more sensors when the autonomous vehicle is moving along a straight path, the particular portion of the one or more sensors comprising the sensors associated with any of the left region, the right region, and the rear of the autonomous vehicle.

10. The method of claim 8, wherein the controlling comprises controlling the rotatable laser scanning system to capture sensor data when the rotatable laser scanning system is facing the region of interest, and configured to control the rotatable laser scanning system to refrain from projecting light onto and capturing when the rotatable laser scanning system is not facing the region of interest.

11. A system comprising:
one or more sensors mounted on a surface of an autonomous vehicle, the one or more sensors capable of capturing sensor data of a plurality of regions surrounding the autonomous vehicle;
one or more processors; and
memory storing instructions that, when executed by the one or more processors, cause the one or more processors to:
identify, based on one or more parameters of the autonomous vehicle, a region of interest from a plurality of regions surrounding an autonomous vehicle based on a predicted path and a speed of the autonomous vehicle, wherein a size of the region of interest is based on the speed such that the size of the region of interest correlates with the speed, the identification of the region of interest further comprising:
in response to the speed being below a threshold speed, and constant or decreasing, determining the region of interest to be directly adjacent to the autonomous vehicle; and
in response to the speed satisfying the threshold speed, or increasing, determining the region of interest to be at a distance away from the autonomous vehicle;
filter the sensor data to include only the sensor data of the region of interest; and
facilitate, based on the filtered sensor data, performance of one or more autonomous vehicle driving actions.

12. The system of claim 11, wherein the one or more processors are implemented on a programmable board.

13. The system of claim 11, wherein the plurality of regions surrounding the autonomous vehicle include a front region corresponding to a region in front of the autonomous vehicle, a left region corresponding to a region to the left of the autonomous vehicle, a right region corresponding to a region to the right of the autonomous vehicle, and a rear region corresponding to a region to the rear of the autonomous vehicle.

14. The system of claim 13, wherein the one or more sensors comprise a plurality of sensors, the plurality of sensors comprising a rotatable laser scanning system and one or more cameras.

15. The system of claim 12, wherein the instructions further cause the one or more processors to selectively refrain from projecting light onto and capturing sensor data from a particular portion of the one or more sensors when the autonomous vehicle is moving along a straight path, the particular portion of the one or more sensors comprising the sensors associated with any of the left region, the right region, and the rear of the autonomous vehicle.

16. The system of claim 13, wherein the instructions further cause the one or more processors to control the rotatable laser scanning system to capture sensor data when the autonomous vehicle is facing the region of interest, and configured to control the rotatable laser scanning system to refrain from projecting light onto and capturing sensor data when the autonomous vehicle is not facing the region of interest.

17. The system of claim 13, wherein the captured sensor data includes first image data corresponding to the region of interest, and second image data corresponding to one or more other regions of the plurality of regions surrounding the autonomous vehicle, and the instructions further cause the one or more processors to remove the second image data from the sensor data.

18. A method comprising:
capturing, using one or more sensors mounted on a surface of an autonomous vehicle, sensor data of a plurality of regions surrounding an autonomous vehicle;
obtaining one or more parameters of an autonomous vehicle, the parameters including any of a position of the autonomous vehicle, a path of the autonomous vehicle, and a speed of the autonomous vehicle;
identifying, based on the one or more parameters of the autonomous vehicle, a region of interest from a plurality of regions surrounding an autonomous vehicle based on a predicted path and a speed of the autonomous vehicle, wherein a size of the region of interest is based on the speed such that the size of the region of interest correlates with the speed, the identification of the region of interest further comprising:
in response to the speed being below a threshold speed, and constant or decreasing, determining the region of interest to be directly adjacent to the autonomous vehicle; and
in response to the speed satisfying the threshold speed, or increasing, determining the region of interest to be at a distance away from the autonomous vehicle;
filtering, in response to the identifying the region of interest, the captured sensor data to include only the sensor data of the region of interest; and
facilitating one or more autonomous vehicle driving actions based on the filtered data.

19. The method of claim 18, wherein the one or more sensors comprise a plurality of sensors, the plurality of sensors comprising a rotatable laser scanning system and one or more cameras.

20. The method of claim 19, further comprising controlling the rotatable laser scanning system to capture sensor data when the autonomous vehicle is facing the region of interest, and controlling the rotatable laser scanning system to refrain from projecting light onto and capturing sensor data when the autonomous vehicle is not facing the region of interest.

21. The method of claim 18, wherein the captured sensor data includes first image data corresponding to the region of interest, and second image data corresponding to one or more other regions of the plurality of regions surrounding the autonomous vehicle, and the filtering comprises removing the second image data from the sensor data.

* * * * *